United States Patent [19]

Meehan

[11] Patent Number: 4,855,046
[45] Date of Patent: Aug. 8, 1989

[54] MULTI-CANISTER, EXTERNALLY-CONNECTED ION REMOVAL SYSTEM

[75] Inventor: Jeffrey Meehan, Wolcott, Conn.

[73] Assignee: Napco, Inc., Terryville, Conn.

[21] Appl. No.: 111,394

[22] Filed: Oct. 22, 1987

[51] Int. Cl.⁴ .............................................. C02F 1/42
[52] U.S. Cl. .................................. 210/232; 210/282; 210/284
[58] Field of Search ............... 210/232, 282, 283, 284, 210/416.1

[56] References Cited

U.S. PATENT DOCUMENTS

| | | | |
|---|---|---|---|
| 3,136,719 | 6/1964 | Serra | 210/284 |
| 3,851,811 | 4/1976 | Casolo et al. | 210/282 |
| 4,025,426 | 5/1977 | Anderson et al. | 210/284 |
| 4,303,512 | 12/1981 | Inacker et al. | 210/93 |
| 4,400,279 | 8/1983 | Wahl et al. | 210/679 |

FOREIGN PATENT DOCUMENTS 0063236 6/1985 European Pat. Off.

Primary Examiner—Ivars Cintins
Attorney, Agent, or Firm—Herbert E. Messenger

[57] ABSTRACT

Disclosed is a simple, economical ion exchange system for cleaning water, particularly rinse water from plating operations. Two or more identical cannisters with clear plastic sidewalls are connected in series and each contains resin in a central zone for removing anions or cations from water pumped from a reservoir through the cannisters. The resin material is held between permeable separator plates which also define inlet and outlet plenums accessible through openings in the sidewall near opposite ends of each cannister. The identical cannisters are stackable in one or more vertical arrays containing any suitable number of cannisters. Standard screw-type pipe fittings connect the inlet and outlet of successive cannisters to facilitate rapid disassembly of a multi-cannister ion exchange system and removal/replacement of cannisters whose resin requires regeneration.

9 Claims, 4 Drawing Sheets

MULTI-CANISTER, EXTERNALLY-CONNECTED ION REMOVAL SYSTEM

BACKGROUND OF THE INVENTION

This invention relates to removal of ions from water and particularly to cannister systems for removing cations and anions in the rinse water of a plating system.

The need for cleaning water after its use in rinsing parts in plating operations has become of increasing importance. Removal of various materials, particularly metal ions, allows reuse of the rinse water, reducing water and sewer costs. Cleaner rinse water results in improved quality of the plated parts, and eliminates metal hydroxide sludges from waste treatment systems. Valuable metals may also be recovered as a by-product of water-cleaning systems.

One prior art system, disclosed in European Pat. No. 63,236, includes a stack of vessels filled with ion exchange resins through which water to be purified is pumped. Each vessel includes porous end plates through which water passes in an axial direction, except that the bottom vessel is a radial-flow electrolytic cell as well as having a central feedthrough tube for directing water to the second vessel in the stack. The stack of vessels are held between end plates of a frame which pressure-load seals between each vessel to prevent leakage of water as it is pumped through the system.

The multiple-vessel system of the above-mentioned patent has certain desirable features—such as allowing different types of ions to be trapped separately by the use of different resins in selected vessels. Also, when one or more vessels, e.g. vessels near the bottom of the stack, become fully loaded with ions, the stack may be disassembled and vessels with fresh resin added to (the top) of the stack. However, this system has clear disadvantages, such as requiring a large, sturdy frame to pressure load the seals between vessels. A different frame is necessary for each stack of different size—i.e., stacks containing different numbers of vessels or vessels of different heights—and a different frame may be required to hold the vessels during regeneration of their resin. Drainage of water from the system prior to its disassembly also appears cumbersome and time-consuming, even if gravity drainage from vessel to vessel is aided by drainage around seals after release of pressure loading.

Accordingly, it is an object of the invention to provide an improved system for removing ions from water.

It is an object of the invention to provide a system for removing ions from water which is of simple, low cost construction.

It is an object of the invention to provide a system for removing ions from water which includes identical interchangeable cannisters which may be easily interconnected in vertical stacks of differing heights, or in horizontal stacks, and without seals between endwalls of adjacent cannisters.

It is an object of the invention to provide a multi-cannister system for removing ions from water which includes a simple method of determining resin loading in each cannister.

It is an object of the invention to provide a system for removing ions from water which includes cannisters whose contents may be quickly and easily regenerated.

SUMMARY OF THE INVENTION

The invention is an improved system for removing ions from water, especially rinse water from plating operations, and a method of fabricating the system. According to the invention two or more substantially identical cannisters or containers of novel construction are connected in series, and a pump is provided to direct water through ion exchange material held with a central zone of each container. Each container includes an inlet in the sidewall of its housing near one endwall and an outlet in its sidewall near a removable cover at the opposite end, with the inlet and outlet providing access to plenums bounded by two separators positioned at selected locations along the length of the housing. A central zone between the separators is adapted to carry ion exchange material, preferably ion exchange resins which may be different in various containers in order to separately trap different types of ions. The outlet of each container is externally connected to the inlet of an adjacent container, and a pump circulates water through each container in succession, then preferably returns the purified water to a tank for re-use.

In a preferred embodiment of the invention cylindrical cannisters with transparent plastic housings are stackable in one or more vertical arrays. Removable covers of such cannisters include upwardly extending members for supporting bottom peripheral portions of the next cannister stacked on top, and the outlet and inlet of adjoining cannisters are connected by standard hose fittings. A stack of cannisters may be readily drained of water and disassembled, after which the ion exchange resin in each cannister may be regenerated without removal from its container by flowing a regenerating fluid, such as acid in the case of metal anions, through the cannister.

Separators used in the cannisters preferably comprise perforated plates whose holes are covered with a fine mesh screen to prevent loss of particles of ion exchange resin. The plates are supported by ring-like flanges welded to the inner sidewall of a cannister and are held in place on the flanges by rods and springs which bear against the upper surface of the plate. The upper flange of each cannister may be formed in two "half ring" sections with radial gaps between each section to facilitate passage of the lower separator plate through the upper flange.

DETAILED DESCRIPTION OF PREFERRED EMBODIMENTS

Figure 1:
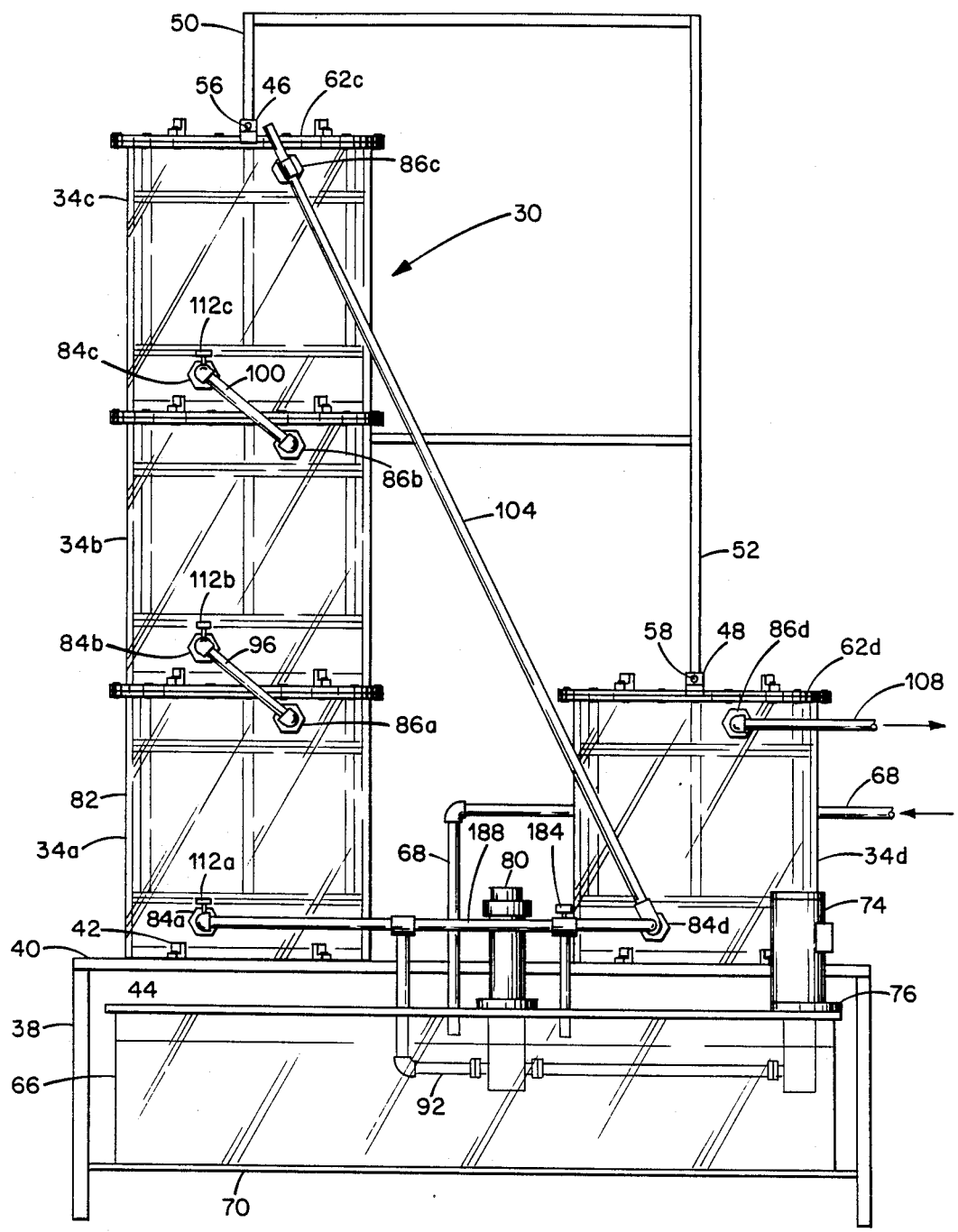
FIG. 1 is a front view of a four-cannister system for removing ions according to a preferred embodiment of the invention.

A preferred ion exchange system 30 (FIG. 1) for removing ions and other impurities from water includes multiple, interconnected containers or cannisters 34 of unique design. Four cannisters are shown in FIG. 1 by way of illustration, but a different number may be employed depending on the application and desired arrangement. Each cannister contains a resin or blend of resins, for removing ions and/or other impurities of various types from the water. For example, if the water to be processed is rinse water of a metal plating operation, it typically contains cations (e.g., of the metals nickel, copper, zinc, and chrome) and anions (e.g., sulfates, chlorides and cyanides), and may also contain organic materials. Use of one resin (or resin mix) in a cannister to collect specific ions (e.g., cations) and a different resin in a subsequent cannister to collect different specific ions (e.g., anions) results in efficient collection of the various ions and facilitates regeneration of the resins.

In the ion exchange system 30 illustrated in FIG. 1 three interconnected cannisters 34a, 34b, and 34c are arranged in one stack and a fourth cannister 34d is positioned aside of bottom cannister 34a and is connected to the top cannister 34c. (Cannister 34d is sometimes referred to hereafter as comprising a second "stack"). The cannisters are supported on a metal base or platform 38 and preferably are all identical, though the resins contained in each may differ, as mentioned earlier. The 3/1 arrangement offers greater stability and may be easier to service than a single stack of four cannisters (FIG. 5)—at the expense, however, of somewhat greater amounts of piping to interconnect all cannisters. The 3/1 system is, of course, only illustrative and other arrangements are acceptable—e.g., two stacks of two cannisters each (2/2) or four adjacent single cannisters (1/1/1/1), or other systems with a lesser or greater number of cannisters.

The base 38 has a flat surface 40 for supporting the cannisters 34, and the surface 40 may include upwardly-projecting locating members 42 spaced about a circumference slightly larger than that of the bottom 44 of a cannister 34 to help position and retain each cannister stack. Lateral support of the stacks is also provided by retaining bars 46 and 48 which extend from, and may be locked to, vertical frame members 50 and 52 at the rear of the platform 38. Threaded bolts 56 and 58 permit the bars 46, 48 to be slid along the frame members 50, 52 and locked into position against the top covers 62c, 62d of cannisters 34c and 34d with a lip at the free end of each bar extending downward along the edge of top cover of its associated cannister to prevent tipping.

A sump tank or reservoir 66 is located below the cannister support surface 40 and may be carried by a lower frame 70 of the base 38. The sump tank 66, preferably of translucent polypropylene, functions during operation of the ion exchange system 30 as a reservoir for holding incoming water received through flow pipe 68 and which is to be cleaned in passing through the cannisters 34. The flow pipe 68 typically is a hose or pipe connected to an outlet of the overflow section of a rinse tank. Sump tank 66 also serves to hold liquid drained by gravity from the cannisters during servicing (e.g., disassembly and replacement of one or more cannisters), and thus is sized to hold at least the total liquid-containing volume of all of the cannisters 34 of the ion exchange system 30.

To direct water from the reservoir 66 through the cannisters 34 and then as clean water back to its point of use, as in a rinse tank of a plating operation, a pump 74 is provided with the reservoir 66. The pump 74 may be positioned near the bottom of the reservoir 66 so as to be submerged in water carried thereby, or it may be mounted on the upper rim 76 of the reservoir 66 with an intake extending below the minimum water level to be maintained during operation of the system 30. (Appropriate water level sensors may be included with the reservoir 66 to shut off the pump and thus avoid burnout if reservoir water level drops below the specified minimum). A suitable pump 74 is a 1-10 gallon/minute pump with a ¾ HP, 110/240/280 volt, single or three phase motor. A filter 80 may also be secured to the reservoir upper rim 76 so as to remove solids from the water prior to its entry into the first cannister 34 of the system 30.

As set forth in greater detail below, each identical cannister 34 includes a cylindrical sidewall 82, preferably of clear plastic such as polyvinylchloride (PVC), and has a single inlet 84 and single outlet 86 in the form of short lengths of pipe extending from its sidewall 82 near the bottom and top ends, respectively, of the cannister. The inlet 84a of the bottom cannister 34a of the 3-cannister stack is connected by a flow pipe 92 to the filter 80, and a U-shaped pipe 96 connects the outlet 86a of the cannister 34a to the inlet 84b of the middle cannister 34b. A similar U-shaped pipe 100 connects the outlet 86b of middle cannister 34b to the inlet 84c of top cannister 34c, and a pipe 104 extends generally diagonally from the outlet 86c of top cannister 34c to the inlet 84d of the remaining cannister 34d. The outlet 86d of this last of the four series-connected cannisters 34 is attached to a return flow pipe 108 which delivers clean water to a rinse tank (not shown) or other location for reuse.

The above-mentioned flow pipes are preferably plastic and several, particularly those attached to an inlet 84 or an outlet 86 of a cannister, include screw-type fittings which permit quick connection and disconnection of the pipes. Shut-off valves 112 may also be included in the inlets 84 of each cannister 34 to prevent water which remains in the cannisters 34 from spilling when the cannisters 34 are disconnected from one another and moved, as during replacement and/or shipment to a regeneration area.

Figure 2:
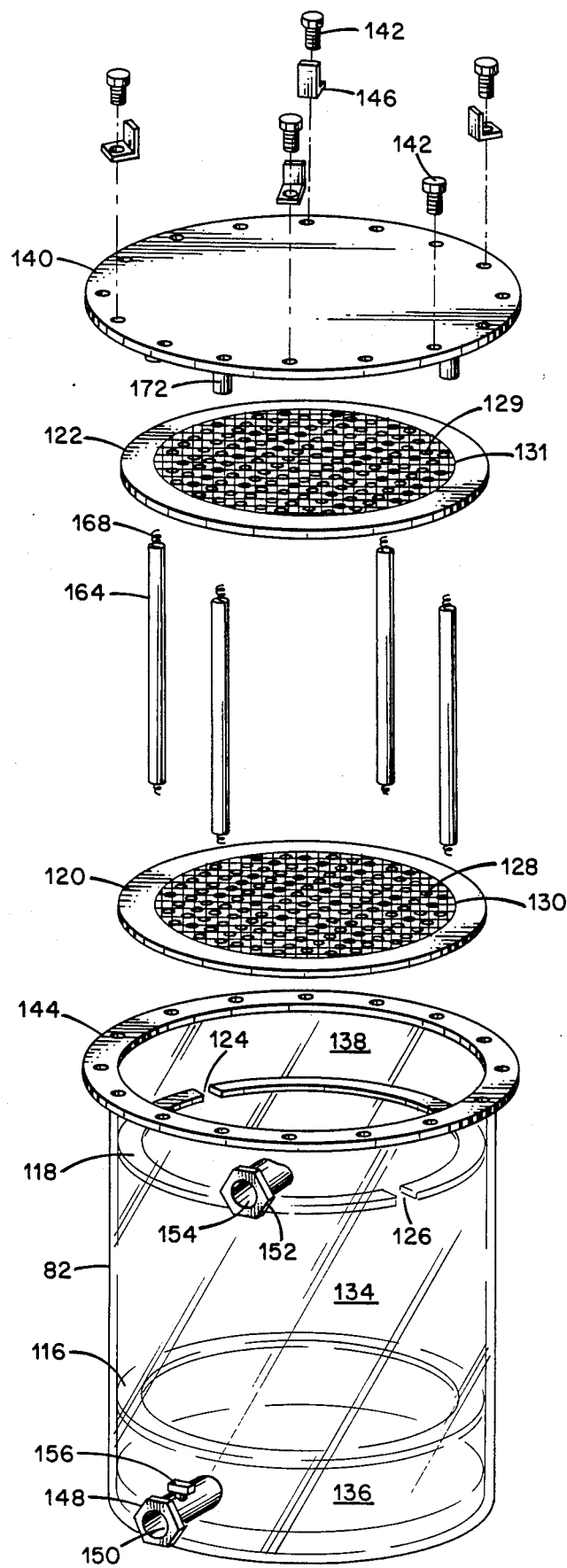
FIG. 2 is an exploded view in perspective of a single cannister of the ion removal system.
Figure 3:
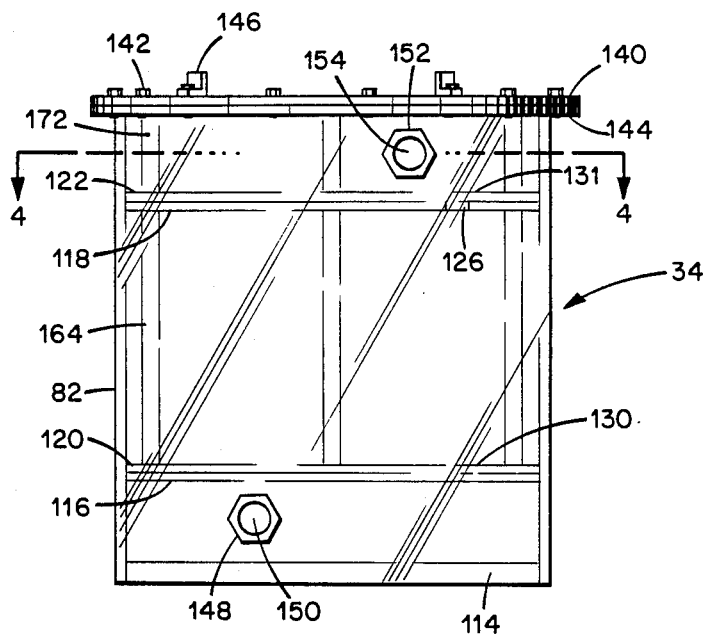
FIG. 3 is a side view of a fully-assembled cannister.
Figure 4:
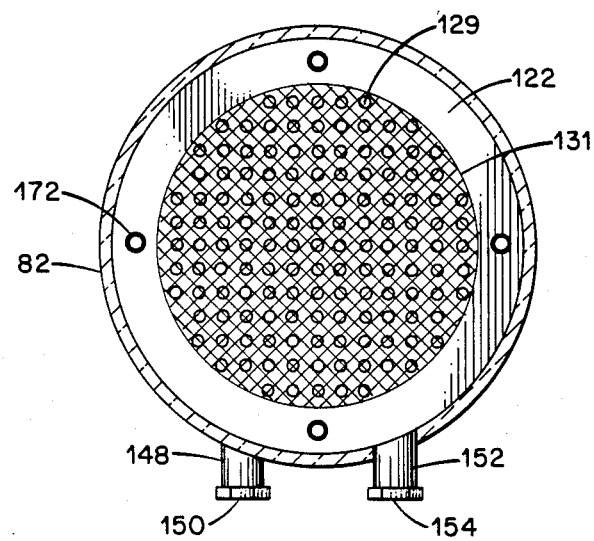
FIG. 4 is a cross-sectional view taken along the line 4—4 of FIG. 3.

Structural details of a preferred cannister 34 and of a method of assembling it are evident in FIG. 2, which shows, in partially exploded fashion, various parts of the cannister. Additional views of an assembled cannister 34 are provided in FIGS. 3 and 4. A major component of the cannister 34 is a cylindrical sidewall 82 formed of clear plastic such as polyvinylchloride (PVC). Clear plastic is preferred because it permits visual inspection of the water being cleansed by the resins contained in the cannisters, and the observed color of the water offers a simple means of determining ion loading of the resins, thus indicating when the resins need to be regenerated. The cylindrical sidewall 82 may be made by cutting a section of flat sheet stock to size, heating and shaping the cut section around a curved mandrel to form a cylindrical shape of suitable diameter such as about 12 inches, and then nitrogen welding a seam along the length of the sidewall 82. A preferred method of forming the sidewall 82, however, is to obtain extruded plastic tubing of the proper diameter and cut it to the desired length (e.g. about 16 inches).

After the sidewall 82 has been formed, a circular piece of plastic material, such as half inch Type II PVC, is attached to one end to form a bottom endwall 114, as by welding or other method suitable for forming a watertight joint. Two ring-shaped flanges 116 and 118 of plastic are also welded to the inner surface of the sidewall 82 at selected distances from the endwall 114 to form supports for filter plates or separators 120 and 122.

The upper flange 118 is preferably constructed of two pieces of a length such that, when installed, two diametrically-opposed radial slits or gaps 124 and 126 are formed between the pieces. The gaps 124 and 126 are wider than the thickness of the lower separator plate 120 so that the plate 120 may be passed (in an orientation normal to the upper flange 118) through the gaps 124, 126 during assembly of the cannister 34.

The plastic separator plates 120 and 122, which may be identical, have a plurality of holes 128, 129 therethrough (e.g., of ⅜ inch diameter on staggered ⅝ inch centers) to permit passage of water through the plates 120, 122. To prevent passage of resin particles through the holes 128, 129 each separator plate 120, 122 has a fine mesh screen 130, 131 bonded (as by ultrasonic welding) to its upper (or lower) surface and covering the holes 128, 129. The holes 128, 129 are generally uniformly distributed over the entire area of each separator plate except for the solid outer ring-shaped portions contacted by the support flanges 116 and 118. These solid ring-shaped portions of the lower surface of each plate 120, 122 may be coated with or have bonded thereto a corrosion resistant, flexible seal.

When installed, the separator plates 120, 122 define between them a zone 134 for holding resin which preferably occupies a majority (e.g., about two-thirds) of the internal volume of the cannister 34. In addition, an inlet plenum 136 is formed between the endwall 114 and the lower separator plate 120, and an outlet plenum 138 is formed between the upper separator plate 122 and a top cover 140 of the cannister 34.

The top cover 140, also preferably of Type II PVC material, has a diameter larger than that of the sidewall 82 and is removably attachable to the cannister 34 by bolts 142 which connect the cover 140 to a flange 144 welded or otherwise bonded to the top of the sidewall 82. The cover 140 also includes several (e.g., four) upwardly-projecting locating members 146 spaced about a circumference slightly larger than that of the bottom endwall 114. These members 146, which may be L-shaped metal pieces bolted to the cover 140, help position and support the next cannister stacked on top of a lower-mounted cannister.

To provide access to the inlet plenum 136, an inlet 148 comprising a short length of plastic pipe is welded to the sidewall 82 between the lower separator 120 and the bottom endwall 114 and communicates with the interior of the cannister 34 through a circular opening 150 in the sidewall 82. Similar access to the outlet plenum 138 is provided by an outlet 152 and an opening 154 in the sidewall 82 between the upper separator 122 and the top cover 140. The inlet 148 and the outlet are preferably at different circumferential positions on the sidewall 82 to provide adequate room for, and servicing of fittings connecting the outlet of one cannister to the inlet of the next above-mounted cannister. The inlet 148 may also include a valve 156 whose closure prevents spilling of water when the cannister is moved after drainage of the ion exchange system and disconnection of the cannister from the system.

During assembly of the cannister 34 the lower separator plate 120 is inserted through the radial slits 124, 126 formed between the two halves of the upper support flange 118 and is placed on the lower support flange 116. To prevent the separator plate 120 from being lifted from the flange 116 as water is passed upwardly through the cannister 34 during operation, rods 164 (four being shown in FIG. 2) are then installed in an array between the separator plate 120 and the upper support flange 118. The vertically-oriented rods 164 may be inserted and retained by wedging them between outer portions of the separator plate 120 and the flange 118, or springs 168 may be installed within the (hollow) rods to hold the rods 164, and thus the separator 120, in place. After the rods 164 have been installed, resin is loaded to occupy about one half to three quarters of the resin-holding zone 134 and is supported by the separator plate 120. Suitable resins are Purolite C-100 strong acid cation, Purolite C-105 weak acid cation, Purolite A-100 weak base anion, Purolite A-104 weak base anion, and Purolite S-940 chelated cation resin available from the Purolite Company, Division of Brotech Corp., Bala Cynwyd, Pennsylvania. The upper separator plate 122 is then placed on its support flange 118 and the top cover 140 is bolted into place. Upward movement of the plate 122 during flow of water through the cannister 34 is prevented by contact with an array of rods 172 attached to and extending downward from the top cover 140, and the rods 172 may, if desired, include springs for applying pressure on the separator plate 122.

Figure 5:
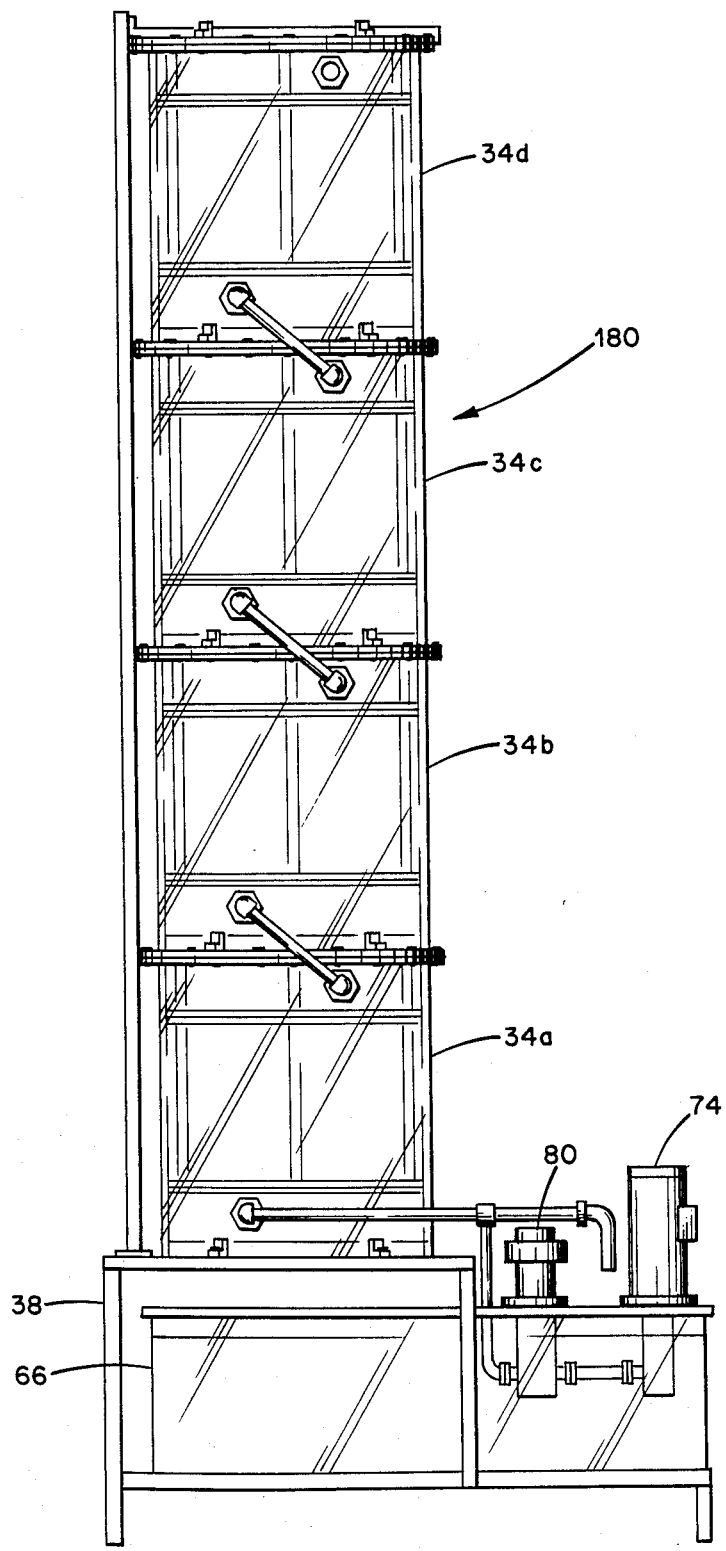
FIG. 5 is a side view of an alternate arrangement of cannisters.

To use cannisters 34 which have been assembled in the above-described manner, the cannisters are arranged in one or more stacks and are interconnected to form an ion exchange system such as the system 30 of FIG. 1, the single stack system 180 of FIG. 5, or a system with a different number of cannisters. Ion-containing water is then pumped from the reservoir 66 through the filter 80 and through each cannister 34, passing in turn through the inlet 148, inlet plenum 136, lower separator plate 120, resin in the resin-holding zone 134 (which removes specific ions), upper separator plate 122, outlet plenum 138, and outlet 152 of each cannister. Clean water is then returned through flow pipe 108 for reuse in a rinse tank of a plating line or, if not needed, may be discharged without further treatment except simple pH adjustment as required.

When the resin in one or more cannisters is fully loaded with ions, the "spent" cannisters are removed and replaced with cannisters having fresh resin. Typically, the cannisters through which water first flows from the reservoir 66 need replacement and regeneration prior to others, although the loading of any cannister also depends on the type and quantity of ions present in the water being filtered and the location of the various resins—, i.e., in which cannisters they are held.

If the incoming water contains ions resulting from rinsing of parts processed in a specific metal electrolyte, the rinse water may be slightly tinted (e.g., blue due to copper, green due to nickel or red due to chromium), as it enters a cannister 34. The colored water becomes clear as the ions are trapped by resin in the cannister, and as the resin becomes loaded with ions, colored water rises to higher levels in a cannister, as is readily visible through the clear plastic sidewall 82. Cannister replacement may, if desired, be performed after the colored water has reached the top of, or a designated level in, a specific cannister, which may be the first, second or succeeding cannister having that resin. Alternatively, the effectiveness of ion removal and need for replacing cannisters can be determined by monitoring electrical conductivity of the water, as by a suitable meter in the return pipe 108, or other portable conductivity measurement or metal analysis device.

When removal of a cannister 34 from the ion exchange system 30 is desired, the pump 74 is shut off and water in the cannisters 34 is drained by gravity into the reservoir 66. To permit drainage, a normally-closed valve 184 (FIG. 1) is opened in a flow pipe 188 which has one open end extending into the reservoir 66 and which is connected to the inlets 84a, 84d of cannisters 34a and 34d and to the diagonal pipe 104. Access for air to replace the draining fluid may be provided by an opening in the upper end of the diagonal pipe 104 which extends above the top of cannister 34c of the three-cannister stack.

After the water has drained and the cannisters 34 have been disconnected by unscrewing selected pipe fittings and unlocking the retaining bars 46 and 48, one or more of the cannisters 34 may be removed and replaced by a cannister with fresh resin. Because the cannisters 34 are identical, they may be arranged in any desired order—e.g., if cannister 34a is removed, the new cannister may be installed as the last cannister 34d in line and the three others moved to positions 34a, 34b and 34c. The ion-loaded cannister is then transported to a regeneration area where ions are flushed from its resin. This may be accomplished by pumping a regeneration fluid, typically acid for an cation-loaded resin and caustic for a anion-loaded resin, through the cannister, and then rinsing the resin with water. Access to any cannister, as for replacement or addition of resin, should either be required is obtained by merely unbolting the top cover 140 and lifting out the upper separator plate 122.

The cannister shown and described herein provide a simple, effective system for removing metal ions and organic materials from water. The identical resin-holding cannisters may be stacked in a variety of arrangements employing any suitable number of cannisters, and the cannisters can be quickly and easily replaced or interchanged. External connections on the cannisters avoid the need for O-rings for sealing between interconnected cannisters, and regeneration or replacement of resin is simple and economical.

The cannisters and ion exchange systems disclosed in this detailed description and illustrated in the drawing are preferred embodiments, and changes may be made therein without departing from the spirit of the invention. The invention is defined as all embodiments and their equivalents within the scope of the claims which follow.

What is claimed is:

1. Apparatus for removing ions from water comprising:
    a plurality of substantially identical, interconnected containers, each container including:
    a. a housing having a sidewall;
    b. an endwall sealing a first end of said housing;
    c. a removable cover for sealing the end of said housing opposite said first end;
    d. an inlet in the sidewall near said endwall;
    e. an outlet in the sidewall near said cover;
    f. a first support flange attached to an inner portion of said sidewall and extending radially inward therefrom, said flange spaced from said endwall a distance greater than is said inlet;
    g. a second support flange attached to an inner portion of said sidewall and extending radially inward therefrom, said second flange positioned between said outlet and said first flange;
    h. a first permeable separator plate adapted to be mounted on said first flange and to define, with said endwall and said sidewall, an inlet plenum;
    i. a second permeable separator plate adapted to be mounted on said second flange and to define, with said cover and said sidewall, an outlet plenum;
    said separator plates further defining, with said sidewall, an ion exchange zone for holding ion exchange material;
    j. ion exchange material in said ion exchange zone defined by said sidewall and said separator plates on said flanges;
    k. means for holding said separator plates on said flanges;
    l. means for connecting the outlet of each said container to the inlet of the next container in series; and
    m. means for directing water into the inlet of each container, through said ion exchange material in said ion exchange zone, and out its outlet.

2. Apparatus as in claim 1 wherein said means for holding said separator plates on said flanges includes a plurality of rods positionable in a vertical array between said support flanges so as to hold said first separator plate against said first support flange.

3. Apparatus as in claim 1 wherein said means for holding said separator plates on said flanges includes a plurality of rods extending downward from said cover so as to hold said second separator plate against said second support flange.

4. Apparatus as in claim 1 wherein said first separator plate has a diameter greater than the inner diameter of said support flanges and said second support flange of each container includes a pair of diametrically opposed radial slits, each said slit having a width greater than the thickness of said first separator plate so as to permit said first separator plate to be passed through said slits when oriented vertically.

5. Apparatus as in claim 1 wherein said connector means comprises a U-shaped flow pipe and said inlet and outlet of successive containers, when interconnected, are offset a selected circumferential distance from each other.

6. Apparatus as in claim 1 wherein each of said inlets includes a shutoff valve.

7. Apparatus for removing ions from rinse water of a plating system comprising:
    at least two substantially identical containers arranged in a vertical stack and connected in series, each container including:
    a. a cylindrical plastic housing
    b. a bottom endwall sealed to the bottom end of said housing;
    c. a cover removably sealable to the top end of said housing;
    d. an inlet in the side of said housing near the bottom end thereof;
    e. an outlet in the side of said housing near the top end thereof, said inlet and said outlet permitting the flow of water into and out of said housing;
    f. a first ring-shaped flange attached to the inner wall of said housing above said inlet;
    g. a second ring-shaped flange attached to the inner wall of said outlet, said second flange including a pair of diametrically opposed radial slits; and
    h. a first perforated separator plate sized to pass through the radial slits of said second flange and to be supportably held on said second flange,
    said first and second plates forming with said bottom endwall and said cover, respectively, an inlet plenum and an outlet plenum and also forming, between said plates, an ion exchange zone for holding ion exchange material;

i. ion exchange material in said ion exchange zone;

j. a flow pipe containing the outlet of each said container to the inlet of the next successive container in series; and k. a pump connected to the inlet of the lowermost container in the stack and operable to pump water through each container in succession.

8. Apparatus as in claim 7 wherein each container includes means for holding said separator plates against said flanges.

9. Apparatus as in claim 8 wherein said plate-holding means comprises a plurality of rods positionable in a vertical array between said flanges.

* * * * *